United States Patent
Yasuda et al.

(10) Patent No.: US 9,974,322 B2
(45) Date of Patent: May 22, 2018

(54) LOOSENING METHOD AND LOOSENING DEVICE FOR COOKED RICE

(71) Applicant: NISSIN FOODS HOLDINGS CO., LTD., Osaka-shi (JP)

(72) Inventors: Shigeru Yasuda, Osaka (JP); Noriyuki Machida, Osaka (JP); Kentaro Saeki, Osaka (JP); Hiroshi Kasuga, Osaka (JP); Mitsuru Tanaka, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 212 days.

(21) Appl. No.: 14/896,391

(22) PCT Filed: Jun. 6, 2014

(86) PCT No.: PCT/JP2014/065045
§ 371 (c)(1),
(2) Date: Dec. 6, 2015

(87) PCT Pub. No.: WO2014/196622
PCT Pub. Date: Dec. 11, 2014

(65) Prior Publication Data
US 2016/0128364 A1    May 12, 2016

(30) Foreign Application Priority Data
Jun. 6, 2013   (JP) ................ 2013-119685

(51) Int. Cl.
*F26B 3/08*    (2006.01)
*A23L 1/025*   (2006.01)
(Continued)

(52) U.S. Cl.
CPC ............ *A23L 1/025* (2013.01); *A23L 5/30* (2016.08); *A23L 7/143* (2016.08); *A23L 7/196* (2016.08);
(Continued)

(58) Field of Classification Search
CPC .... F26B 2200/06; F26B 2210/02; F26B 3/08; A23L 7/196; A23L 7/143; A23L 5/30; A23L 1/025; A23V 2002/00
See application file for complete search history.

(56) References Cited

FOREIGN PATENT DOCUMENTS

| JP | S50-094153 A | 7/1975 |
|---|---|---|
| JP | H01-235552 A | 9/1989 |

(Continued)

OTHER PUBLICATIONS

English translation of JP 2011-217666 A, Takashi, Apr. 11, 2011.*
(Continued)

*Primary Examiner* — Jessica Yuen
(74) *Attorney, Agent, or Firm* — Seed Intellectual Property Law Group LLP

(57) ABSTRACT

A device includes a loosening room into which cooked rice is fed, an air blowing port which is configured to blow high-speed air toward the cooked rice in the loosening room; and a collecting room provided adjacent to the loosening room with a wall therebetween, the high-speed air is blown from the blowing port and is blown to the cooked rice in the loosening room such that the cooked rice is scatted and floated by blowing the air, and the cooked rice floating and moving over the wall is collected by the collecting room.

5 Claims, 2 Drawing Sheets

(51) Int. Cl.
    *A23L 5/30*          (2016.01)
    *A23L 7/143*        (2016.01)
    *A23L 7/196*        (2016.01)

(52) U.S. Cl.
    CPC ............ *F26B 3/08* (2013.01); *A23V 2002/00* (2013.01); *F26B 2200/06* (2013.01)

(56) References Cited

FOREIGN PATENT DOCUMENTS

| | | |
|---|---|---|
| JP | H04-271760 A | 9/1992 |
| JP | H10-151071 A | 6/1998 |
| JP | 2004-097132 A | 4/2004 |
| JP | 2004-159561 A | 6/2004 |
| JP | 2011-217666 A | 11/2011 |

OTHER PUBLICATIONS

International Search Report, dated Sep. 9, 2014, for PCT/JP2014/065045, 2 pages.
Extended Search Report from European Patent Office dated Oct. 5, 2016, issued in corresponding European Application No. 14807793.6 (6 pages).

\* cited by examiner

LOOSENING METHOD AND LOOSENING DEVICE FOR COOKED RICE

TECHNICAL FIELD

The present invention relates to a loosening method and a loosening device which loosen cooked rice into individual grains when producing instant cooked rice or frozen cooked rice.

BACKGROUND ART

Instant cooked rice or frozen cooked rice is produced from cooked gelatinized rice by drying or quick freezing. It is convenient since it becomes eatable with heating by pouring hot water, by immersing in hot water or by using a microwave oven. Recently, with technology innovation, instant cooked rice or frozen cooked rice can have texture and taste quite similar to those of actually cooked rice, cooked fried rice, or cooked pilaf, and therefore, the number of products and the amount of sales have been both increased.

One of important aspects in producing such products is to make cooked rice into individual grains, that is, to loosen cooked rice not to become a lump state.

Cooked rice tends to become an agglomerated state (lump state) as the surfaces of the rice grains are gelatinized through cooking to become highly sticky, whereby the rice grains bind together. When producing instant cooked rice, for example, if cooked rice is in an agglomerated state, the center portion of the agglomerated state rice is hard to dry, resulting in insufficient or uneven drying. Even if the cooked rice can be dried, the bound portion is hard to be reconstituted in hot water and is poor in texture. Further, when producing frozen cooked rice, quick and even freezing cannot be made, and after produced, it is hard to unfreeze.

It is important to loosen such cooked rice into individual grains, and most of conventional cooked rice loosening methods loosen the cooked rice mechanically by stirring up it using a radially shaped rotary vane or the like. However, those loosening methods applying a mechanical force using such rotary vane have disadvantages that rice grains are smashed and the loosening effect cannot be provided over the whole cooked rice fed in.

The present invention provides a cooked rice loosening method using air. Here, prior an technology for loosening cooked rice using air is disclosed in Patent Document 1 and 2. These prior art documents respectively disclose a method in which cooked rice is dropped down, and strong air is applied to the dropping cooked rice to blow it off. However, in this method, the time of applying the strong air to the cooked rice is short, so that a sufficient effect cannot be expected.

PRIOR ART DOCUMENT

Patent Document

Patent Document 1: JP-A-S50-9413
Patent Document 2: JP-A-H1-235552

SUMMARY OF THE INVENTION

Problem to be Solved by the Invention

The object of the present invention is to provide a method and a device which, in a process of producing instant cooked rice or frozen cooked rice, loosen cooked rice into individual grains sufficiently and wholly, and particularly, to provide a method which gives smaller damages such as smashing cooked rice and a device suitable for employing such method.

Means for Solving the Problems

That is, the present invention provides a cooked rice loosening method for loosening highly sticky cooked rice easy to form agglomerates using high-speed air, wherein cooked rice is fed into a loosening room, high-speed air is blown to the cooked rice in the loosening room to be scattered and floated, and the floating cooked rice is collected by a collecting room provided adjacent to the loosening room.

That is, the high-speed air is blown to the cooked rice fed into the loosening room to be scattered and floated, and the cooked rice floated as individual grains is collected into the collecting room which is a separate room provided adjacently, thereby collecting the cooked rice loosened into individual grains. Meanwhile, insufficiently loosened agglomerated-state heavy cooked rice remains in the loosening room, and further high-speed air is blown to the remaining cooked rice to loosen it, thereby achieving great loosening efficiency.

Further, according to the present invention, it is preferred that the loosening room and collecting room are partitioned by a wall, and the cooked rice floated by the high-speed air and moved over the wall is collected by the collecting room.

That is, if the loosening room and another room are partitioned by the wall to form the respective rooms, the cooked rice floating as individual grains can be surely collected by a device having a simple structure, and further, the degree of loosening can be adjusted by changing the height of the wall.

Further, in the above loosening methods, if the loosening room is configured to be transferred continuously, and while transferring the loosening room, the high-speed air is blown, and the cooked rice floated by the air and moved over the wall is collected by the collecting room, the cooked rice in the loosening room can be loosened while gradually reducing the amount of cooked rice during the transfer.

Since the cooked rice is loosened while transferring the loosening room, the agglomerated-state cooked rice in the loosening room can be gradually reduced during the transfer and the air can be blown in a focused manner to the cooked rice which has not been loosened and remains as agglomerated-state rice, so that sufficiently loosened cooked rice can be obtained when the transfer ends. Further, according to this configuration of loosening the cooked rice while transferring the room, the degree of loosening can be adjusted by adjusting the transfer speed of the room.

Further, according to the present invention, the following device is preferred.

That is, a cooked rice loosening device comprising: a loosening room into which cooked rice is fed; an air blowing port which is configured to blow high-speed air toward the cooked rice in the loosening room; and a collecting room provided adjacent to the loosening room with a wall therebetween, wherein the high-speed air is blown from the blowing port and is blown to the cooked rice in the loosening room such that the cooked rice is scattered and floated by blowing the air, and the cooked rice floating and moving over the wall is collected by the collecting room.

According to this device, among the cooked rice, one floating as individual grains is collected into the adjacent room, whereas one in agglomerated state remains in the loosening room and is further loosened by the high-speed air into individual grains, thereby achieving highly efficient and sufficient loosening of the cooked rice.

Further, in the above cooked rice loosening device, it is preferred that the loosening room is provided on a conveyor to be transferable, the air blowing port is provided in plural above a transfer path of the conveyor, and the collecting room is provided at a side of the transfer path of the conveyor.

If the loosening room is provided on the conveyor and the blowing ports for blowing high-speed air are provided in plural vertically above the transfer path, as the conveyor is transferred below the blowing ports, air is blown evenly to the cooked rice in the loosening room, and with such transfer, cooked rice loosened into individual grains is collected into the collecting room provided at a side to thereby gradually reduce the amount of cooked rice in the loosening room. Further, since the collecting room is provided at a side with respect to the conveyor transfer direction, it is not necessary to form an air blowing hole in the collecting room, so that air can be fed into the loosening room in a focused manner. Also, according to this configuration of transferring the loosening room using the conveyor, the degree of loosening can be adjusted by adjusting the speed of the conveyor.

Here, it is preferred that the loosening room is divided to plural rooms by screens projecting convexly on the conveyor. When the loosening room is divided to plural rooms by the convexly projecting screen, cooked rice, which is going to move in the conveyor advancing direction or in the opposite direction by the blown high-speed air, can be left within the loosening room. Accordingly, the high-speed air can be efficiently applied to the cooked rice. For this purpose, it is preferred that the screen on the conveyor for partitioning the loosening rooms may be higher than the wall for partitioning the loosening rooms from the collecting room.

Further, above the loosening room, there may be provided a top plate at a position higher than the wall provided between the collecting room and loosening room, and a gap may be formed between the top plate and the wall, so that cooked rice floating through the gap over the wall may be collected in the collecting room.

When the cooked rice floating over the wall through the gap between the top plate and the wall partitioning the loosening room and collecting room is collected in the collecting room provided at a side, the degree of loosening can be adjusted by adjusting the size of the gap. Here, when the top plate is transferred together with the loosening room, the top plate needs to be an air permeable plate such as a net-shaped plate in order not to block the air from the blowing port; whereas, when the top plate is fixed to the device, only the air blowing port may be formed as an opened hole and the air blowing port may be exposed from the opened hole or may be formed substantially flush therewith.

Further, according to the present invention, high-speed air is necessary since cooked rice needs to be scattered and floated. A device capable of blowing 50 m/s or more of high-speed air from the inside or vicinity of the blowing port is described as an example. It is preferred that the device may have capability of blowing 60 m/s or more of high-speed air.

Effects of the Invention

According to the cooked rice loosening method and the cooked rice loosening device of the present invention, after cooked, cooked rice easy to form lumps or lump-state cooked rice can be loosened into individual grains highly efficiently. Specifically, high-speed air is blown to the cooked rice to be scattered to thereby loosen it into individual grains. The cooked rice as individual grains is caused to float by the high-speed air, and the floating cooked rice is collected by the collecting room, so that the amount of cooked rice in the loosening room is reduced gradually. Then, since the high-speed air is further blown continuously to the cooked rice remaining in the loosening room, the remaining agglomerated-state cooked rice can be loosened in a focused manner. That is, according to the cooked rice loosening method and the cooked rice loosening device of the present invention, the rice grains are not smashed but the loosening effect can be provided over the whole of the cooked rice.

DESCRIPTION OF EMBODIMENTS

Hereinafter, there will be described an embodiment of a device according to the present invention and a loosening method next. The following embodiment is just an example of the present invention, and thus, of course, changes and modifications can be added properly along the gist of the present invention.

Figure 1:
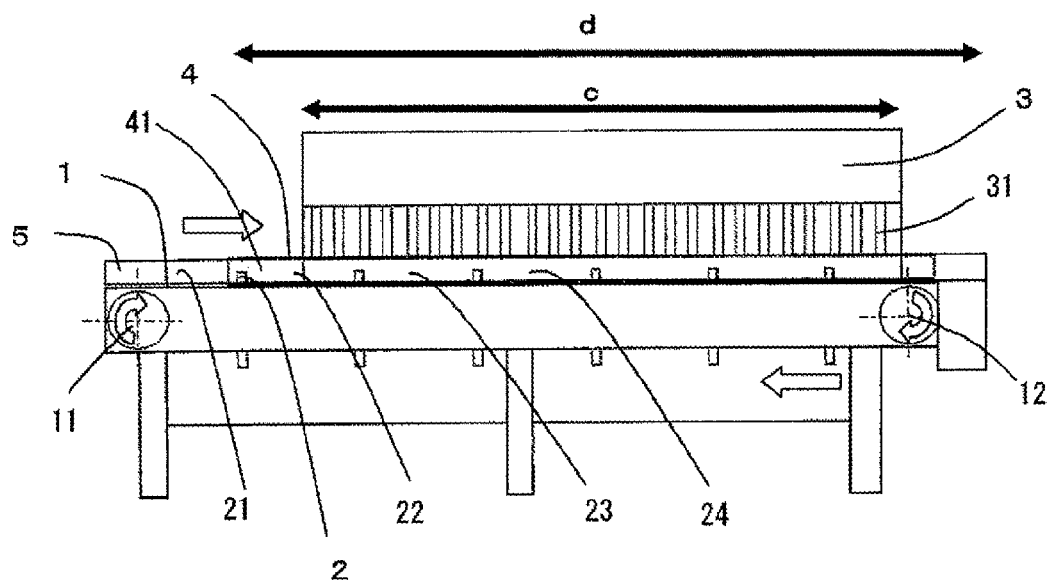
FIG. 1 is a side view of a device according to an embodiment of the present invention.
Figure 2:
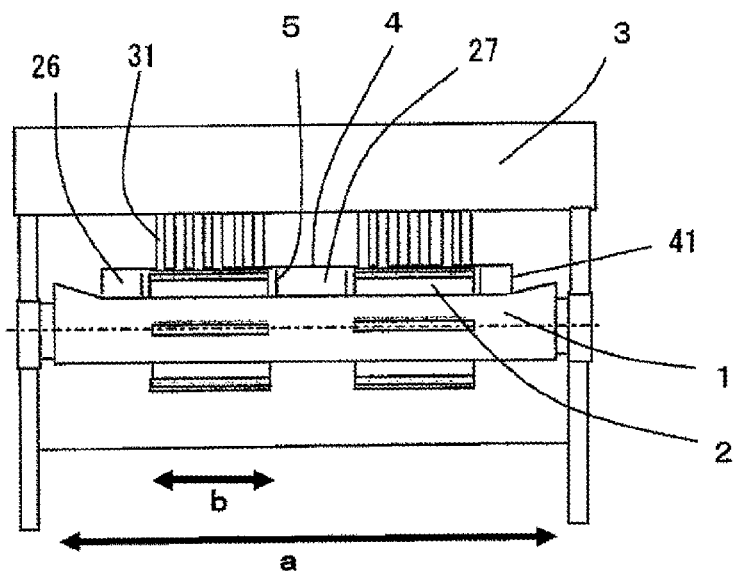
FIG. 2 is a front view (entrance side) of the device shown in FIG. 1.
Figure 3:
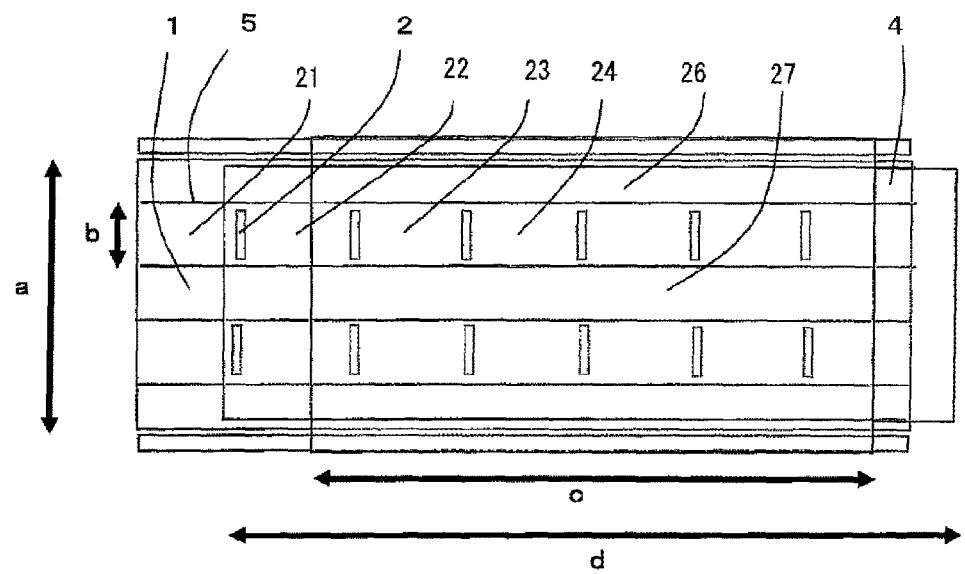
FIG. 3 is a transparent view of the device shown in FIG. 1 down to a conveyor floor surface when viewed from above.

FIG. 1 is a side view of the device, FIG. 2 is a front view thereof and FIG. 3 is a transparent view thereof down to a conveyor upper surface when viewed from above.

In the drawings, a wide belt conveyor 1 has a width "a" and is wound around rollers 11, 12, and the conveyor 1 is moved in an endless manner in the arrow direction while the roller 12 is rotated by a motor (not shown). On the conveyor 1, there are provided two rows of screens 2 in the width direction, and the screens 2 have a width "b" and arranged at regular intervals. As the conveyor 1 is moved, the screens 2 are also moved.

Meanwhile, above the conveyor, in a section "c", narrow tubular blowing nozzles (air blowing ports) 31 are hung down from a chamber 3, so that high-speed air can be blown down vertically toward the conveyor 1. The top portion of the chamber 3 is connected to a duct (not shown), and the duct is connected to a blower (not shown) for blowing out high-speed air. The blowing nozzles 31 are arranged in a large number densely in the conveyor advancing direction within the section "c" in the device side view (FIG. 1) and are arranged densely within the width "b" of the screen 2 on the conveyor in the front view (FIG. 2). That is, the blowing nozzles 31 are arranged in a belt-like manner in an area having the width "b" and length "c" and are not arranged in other areas.

A tunnel-shaped top plate (cover) 4 is fixed to the base of the conveyor or the chamber 3 in a section "d" so as to cover the upper surface of the conveyor 1. The upper surface of the top plate 4 is formed with punching holes at portions corresponding to the blowing nozzles so as not to interfere with air blown from the blowing nozzles 31 provided above the conveyor. The openings of the blowing nozzles 31 and the top plate 4 are arranged substantially flush with each other. The end of the top plate 4 on the side-surface side of the device is bent downward perpendicularly and forms a side wall 41 substantially perpendicular to the upper surface of the conveyor 1 while the tip end thereof has almost no gap with the upper surface of the conveyor 4. That is, in the device, a tunnel is formed by the top plate 4 and the conveyor 1 serving as the floor surface of the tunnel is moved in the arrow direction. Here, the height of the screen 2 is set slightly lower than the top plate 4.

In the whole section of the conveyor 1, walls 5 are fixed to the base of the conveyor or the chamber 3 so as to sandwich the screen 2 with a distance substantially equal to or slightly larger than the width "b" of the screen 2 on the conveyor 1. A space surrounded by the wall 5, screen 2, top plate 4 and the floor surface of the conveyor 1 serve as loosening rooms 21, 22, 23, 24 . . . , and cooked rice is fed into the loosening rooms 21 . . . , respectively, and as the movement of the conveyor 1, the loosening rooms 21 . . . are transferred in the arrow direction.

At a side of the transfer path of the loosening rooms, belt-shaped collecting rooms 26, 27 are separately formed while partitioned by the wall 5. The collecting room 26 is a space surrounded by the wall 5, top plate 4, the side wall 41 of the top plate 4 and the floor of the conveyor 1, whereas the collecting room 27 is a space surrounded by the wall 5, the wall 5 in the adjacent row, the top plate 4 and the floor of the conveyor 1.

The height of the wall 5 is set to have a predetermined gap with the top plate 4 such that cooked rice floating as individual grains is collected from the loosening rooms 22, 23 . . . into the collecting rooms 26, 27 through this gap over the wall 5. By changing the height of the wall 5 to adjust the width of the gap, the loosening degree of the cooked rice to be collected by the collecting rooms can be adjusted. For example, when the rice grains should be loosened well grain by grain, the gap may be set smaller; whereas, when agglomerates of several rice grains are allowed to remain, the gap may be set larger. Further, by changing the height of the wall 5 successively, for example, by lowering the height of the wall 5 in a stepwise manner as proceeding toward downstream of the conveyor 1, cooked rice loosening can be performed efficiently. For example, when the height of the wall 5 in the conveyor 1 upstream side area of the section is set higher to thereby set the gap between the wall 5 and top plate 4 smaller, and the height of the wall 5 in the conveyor 1 downstream side area of the section "c" is set lower to thereby set the gap larger, cooked rice can be loosened elaborately in the loosening rooms on the upstream side of the conveyor 1, and cooked rice loosened sufficiently in the loosening rooms can be collected efficiently by the collecting rooms 26, 27 on the conveyor 1 downstream side.

Here, the device is not limited to the above embodiment. In the above description, the loosening rooms 21 are transferred in two rows on the conveyor 1. However, one row or plural rows may also be employed. Also, only the loosening rooms may be transferred by the conveyor, and the collecting rooms may be formed as fixed structures. Although the collecting room 26 is formed as a continuous belt-shaped room, collecting rooms may be formed so as to correspond to the respective loosening rooms 21, and the collecting rooms may be provided with air blowing ports. Although the top plate 4 is formed as a fixed structure, it may be formed as a net-shaped structure and may be transferred together with the movement of the conveyor 1. The wall 5 may be provided on the conveyor 1 so as to be transferred together with the conveyor. The point is that the structure includes a loosening room, blowing ports for blowing high-speed air toward cooked rice in the loosening room, and a collecting room for collecting cooked rice scattered and floated by the air. In the above embodiment, there is shown the continuous type loosening device in which the loosening rooms 21 are movable. However, there may be employed a batch type device in which the loosening room is not movable.

Next, referring to FIG. 4, there will be described a cooked rice loosening method using the loosening device shown in FIGS. 1 to 3. Outside the left ends of FIGS. 1 and 3, there is provided a rice cooking device (not shown) and cooked rice is fed into the loosening room (21 in the drawings) placed on the left end of the conveyor 1, that is, placed at a location not covered by the top plate 4. This feeding may be performed automatically by a machine, or may be performed by an operator such that a substantially equal amount of rice is fed into each loosening room. The cooked rice fed on the conveyor left end enters below the top plate 4 (section "d") as the conveyor is transferred in the right direction of the drawings (in the arrow direction), and further enters below the blowing nozzles 31 (section "c") for blowing high-speed air.

Figure 4:
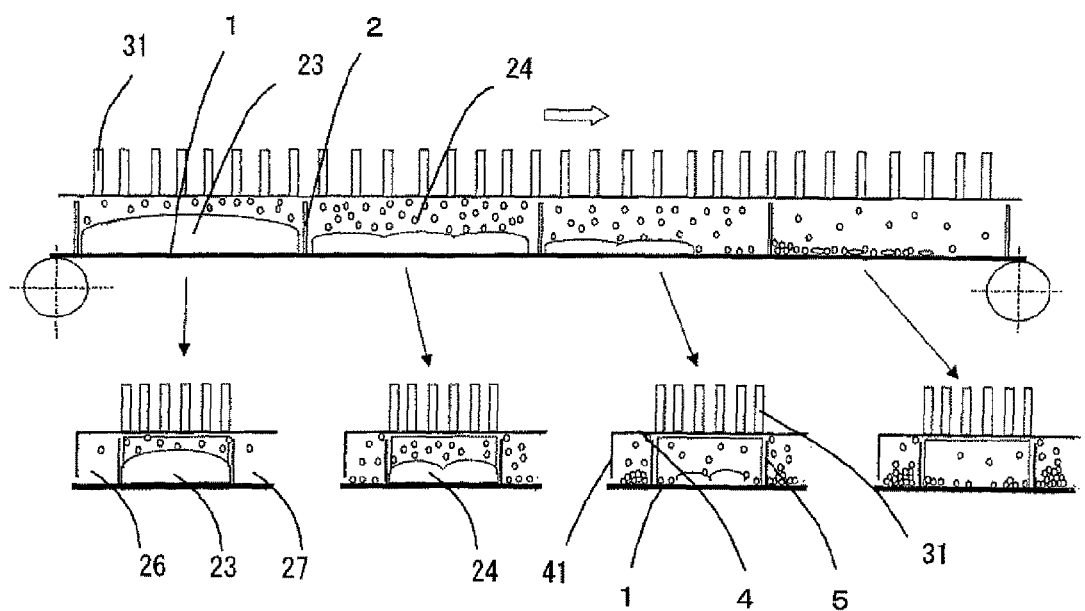
FIG. 4 is an explanatory view of a loosening method of the present invention using the device shown in FIG. 1.

FIG. 4 shows the blowing nozzles 31 and the state of the cooked rice existing below in the section "c". The upper part of FIG. 4 is a conceptual section view of the loosening rooms 23, 24 . . . when the main parts of the loosening device are viewed from a direction (device side direction) parallel to the advancing direction of the loosening rooms, whereas the lower part is a conceptual section view of the loosening rooms 23, 24 . . . when they are cut in a direction perpendicular to the advancing direction thereof, thereby showing a state where, with transfer of the conveyor 1, the cooked rice in the loosening rooms reduces and is collected by the collecting rooms. Firstly, the cooked rice which is fed from the left side of FIG. 4 and reaches the position of the loosening room 23 is blown off into individual grains by high-speed air blown down vertically from the blowing nozzles 31, and cooked rice as the individual grains is caused to float around. The floating cooked rice moves over the wall 5 partitioning the loosening room 23 and collecting rooms 26, 27 from each other through the gap between the wall 5 and the top plate 4 and is collected into the collecting rooms 26, 27. In this case, the screens 2 partitioning the loosening rooms from each other keep the cooked rice within the loosening room 23, which is going out due to the high-speed air blown thereto without being collected by the collecting rooms 26, 27, thereby preventing it from escaping into another loosening room in the conveyor advancing direction.

According to the present invention, since cooked rice is loosened using air, the stickiness of the cooked rice surface is reduced by the air and thus rice grains are hard to bind with each other again, that is, this action can also provide a high loosening effect.

Next, in FIG. 4, as the loosening rooms advance in the right direction (arrow direction) in FIG. 4 through transfer of the conveyor 1, cooked rice in the loosening rooms reduces gradually (reduces in the order of 23, 24 . . . ), whereas cooked rice as individual grains is collected gradually into the collecting rooms. In this process, since the amount of cooked rice in the loosening rooms reduces gradually (23>24> . . . ), high-speed air is efficiently blown to agglomerated-state cooked rice in the loosening rooms. Also, in this embodiment, since the collecting rooms 26, 27 are also transferred by the conveyor 1 similarly to the loosening rooms 21, 22, . . . , as they are transferred in the right direction of FIG. 4, the amount of loosened cooked rice in the collecting rooms increases.

When the loosening rooms has passed through the section "c" where high-speed air is blown on to the cooked rice and reaches the conveyor right end, the loosened cooked rice collected in the collecting rooms falls down from the conveyor 1 and is then sent to a next process such as a drying process. Also, although cooked rice remaining in the loosening rooms can be returned to the left end of the conveyor 1 again, when the loosened degree is quite well, or when the following process includes a sifting process or the like, it can also be sent to the next process together with the cooked rice in the collecting rooms.

EXAMPLE

There will be described the results of an example in which cooked rice was actually fed into the device shown in FIGS. 1 to 3.

The area of each of the loosening rooms 21, 22, 23 . . . (room surrounded by the wall 5, screen 2, top plate 4 and the floor of the conveyor 1) was set as 450 mm (width "b")×500 mm, the height of the wall 5 was set as 65 mm, and the height from the surface of the conveyor 1 to the top plate 4 was set as 70 mm. The top plate 4 is formed with punching open-holes at positions corresponding to the blowing nozzles 31. The blowing nozzles (air blowing ports) 31 were formed in a section of 1500 mm above the transfer path of the loosening room 21 (section "c"), and 280 nozzles 31 were formed in this section "c". The open-portion of each nozzle 31 and the surface of the top plate 4 were formed flush with each other.

3200 g of cooked rice containing about 60% of water was fed substantially evenly into the loosening room 21 on the left end of FIG. 3, and the conveyor 1 was transferred and high-speed air was blown out of the blowing nozzles 31 for loosening the cooked rice in the loosening room. The speed of the conveyor 1 was set to pass through the high-speed air blown section "c" in 30 seconds, and air of about 60° C. was blown from the blowing nozzles 31 at the nozzle outlet speed of 100 m/s. As a result, after passage of the section "c", most of the cooked rice was moved to the collecting room. The rice grains in the collecting room and a small amount of rice remaining in the loosening room, which has almost no agglomerated-state rice, were both found sufficiently loosened into individual grains.

DESCRIPTION OF REFERENCE NUMERALS

1: conveyor
2: screen
4: top plate (cover)
5: wall
21, 22, 23, 24: loosening room
26, 27: collecting room
31: blowing nozzle (air blowing port)

The invention claimed is:

1. A cooked rice loosening method comprising:
feeding cooked rice into a loosening room;
continuously advancing the loosing room;
blowing high-speed air to the cooked rice in the advancing loosening room, the speed of the high-speed air being sufficient to scatter and float the cooked rice in the advancing loosening room;
scattering and floating the cooked rice in the advancing loosening room; and
gradually reducing an amount of the cooked rice in the advancing loosening room by collecting the scattered and floated rice in a collecting room provided adjacent to the advancing loosening room.

2. The cooked rice loosening method according to claim 1,
wherein the loosening room and the collecting room are partitioned by a wall, and
the cooked rice floated by the high-speed air moves over the wall into the collecting room.

3. A cooked rice loosening device comprising:
a loosening room, which in operation, receives cooked rice and is transferable along a transfer path;
an air blowing port provided in plural above the transfer path, which in operation, blows high-speed air toward the cooked rice in the loosening room, a speed of the high-speed air being sufficient to scatter and float the cooked rice received in the loosening room;
a collecting room adjacent to the loosening room and at a side of the transfer path of the loosening room; and
a wall between the loosening room and the collecting room,
wherein the high-speed air blown from the blowing port causes the cooked rice to be scattered and floated, and the floated cooked rice moves over the wall into the collecting room.

4. The cooked rice loosening device according to claim 3, wherein a top plate is provided above the loosening room at a position higher than the wall provided between the loosening room and the collecting room such that a gap is formed between the top plate and the wall.

5. The cooked rice loosening device according to claim 3, wherein the speed of the high-speed air blown from the air blowing port is between 50 m/s and 100 m/s.

* * * * *